Patented Oct. 16, 1951

2,571,091

UNITED STATES PATENT OFFICE 2,571,091

4-AMINO CARDANOL

David Wasserman and Solomon Caplan, New York, N. Y., assignors to The Harvel Corporation, a corporation of New Jersey No Drawing. Application August 21, 1948, Serial No. 45,566

1 Claim. (Cl. 260—575)

This invention relates to novel compositions of matter and also to novel products containing said novel compositions of matter as component thereof. In one of its more specific aspects the novel composition of matter finds particular application as an anti-oxidant for petroleum products such as turbine oils, hydraulic oils, motor oils, cutting oils, petroleum waxes, etc., and as a gum inhibitor in cracked gasoline stocks.

For the aforesaid purposes, there are now on the market such compounds as p-aminophenol and p-tertiary butyl amino phenol. The chief drawback of such compounds, especially when employed in combination with gasoline has been their insufficient solubility in gasoline and their water solubility characteristic is too high.

In the course of our experimentations, we have provided a novel compound which is amino cardanol and has the following formula:

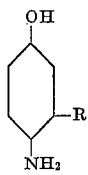

in which R is a straight chain unsaturated hydrocarbon substituent of 15 carbon atoms and whose unsaturation is due solely to one or more ethylenic linkages.

Amino cardanol is particularly useful as an anti-oxidant for petroleum products, such as turbine oils, hydraulic oils, motor oils, cutting oils, petroleum waxes and the like and particularly as a gum inhibitor in cracked gasoline because of its high solubility in petroleum and its fractions, and because of its extreme water insolubility characteristic. Petroleum as well as its various fractions, whether liquid or solid shall be termed mineral hydrocarbons.

In the preparation of the novel additive, one of the materials is cardanol which may be obtained from cashew nut shell liquid. For this purpose cashew nut shell liquid, either raw or treated to remove the naturally occurring metals therein as set forth in U. S. Patents 2,128,247 and 2,067,919 is steam or vacuum distilled at 500° F.–600° F. and the distillate measuring 25%–75% by weight of the cashew nut shell liquid is collected and has a boiling point of approximately 225° C. at 10 mm. of mercury pressure. The distillate is technical cardanol consisting in most part of a phenol having in the meta position a 15-carbon atom straight chain unsaturated hydrocarbon substituent whose unsaturation is due solely to one or more ethylenic linkages. If desired, said distillates may be distilled or treated in some other manner to purify the cardanol. The cardanol in either its pure or impure state may be employed in the practice of this invention.

The novel compound of this invention may be produced by coupling benzene diazonium chloride with the sodium salt of cardanol in ethanol and after reduction of the azo dye thus formed with sodium hydrosulfite, the 4-amino cardanol was distilled in vacuum. It was collected in test tubes that were sealed while under vacuum. The compound was very sensitive to oxygen and air had to be excluded from the vessels. It was found to be water insoluble, and soluble in gasoline to a concentration of 50% at room temperature and to a concentration in excess of 0.13% after 24 hours at 0° C.

A comparison of the solubility characteristic in cracked gasoline of 4-amino cardanol, against 4-amino hydrogenated cardanol (4-amino-3-pentadecyl phenol) showed that the former has a solubility characteristic in cracked gasoline at 0° C. that is more than ten times that of the latter.

The following procedure is given merely by way of illustration and not limitation of a method which may be employed for the production of novel 4-amino cardanol.

Example

Benzene diazonium chloride was prepared by placing 42.3 g. of aniline and 50 cc. of water in a 2-liter beaker. To this was added 111.6 g. of concentrated hydrochloric acid slowly, to form the hydrochloride of aniline, and then 220 cc. of 95% specially denatured alcohol 3-A (S. D. 3-A) to form a clear solution. A concentrated solution of 33 g. of sodium nitrite in 150 cc. of 50% S. D. 3-A was added to the stirred aniline hydrochloride solution at 0° C. below the surface of the liquid in the beaker. The resultant benzene diazonium solution was then added below the surface of a solution of 126.7 g. of cardanol dissolved in 100 cc. of 95% ethanol to which had been added 74.0 g. of potassium hydroxide dissolved in 200 cc. of S. D. 3-A. The mixture was kept at 0° C.–10° C. by means of an ice-salt bath. This was stirred 2 hours after the last addition of the diazonium salt in a 3-liter 3-necked flask.

The reduction was carried out by first adding a solution of 75 g. of potassium hydroxide in 225 cc. of S. D. 3-A and then, at the reflux temperature of ethanol, was added 165 g. of powdered sodium hydrosulfite in 25 g. portions. After refluxing and stirring for one-half hour the dye changed from deep red to a tan solution. The reaction mixture was slightly acid. The salts were permitted to settle, and the cooled upper layer was poured through glass wool into a separatory containing benzene saturated with sulphur dioxide. This was washed once with an equivalent volume of sulphur dioxide saturated water and once with 50% S. D. 3–A partially saturated with sulphur dioxide. The benzene layer was dried with calcium sulfate, filtered, the benzene removed in vacuo and the residue distilled at 0.5 mm. The middle fraction representing a 42% yield distilled at 235° C. at 1 drop per second. The distillate, 4-amino cardanol was collected, solidified at room temperature and melted at 46–52° C.

Generally, the 4-amino cardanol is dissolved in the mineral hydrocarbon in an amount sufficient to serve as an antioxidant and to serve as a gum inhibitor and is soluble in the mineral hydrocarbon liquids in amounts as great as 50% based on the weight of the hydrocarbon liquid.

For our purposes however, we prefer that the quantity of said 4-amino cardanol to the gasoline and preferably cracked gasoline, be in the following ratio range: 1–10,000 to 1–100 parts by weight and generally for most purposes 1–10,000 to 1–1000 parts by weight.

We claim:

A novel compound: 4-amino cardanol.

DAVID WASSERMAN.
SOLOMON CAPLAN.

REFERENCES CITED

The following references are of record in the file of this patent:

UNITED STATES PATENTS

| Number | Name | Date |
| --- | --- | --- |
| 1,920,828 | Wyler | Aug. 1, 1933 |
| 2,040,183 | Ostromislensky | May 12, 1936 |
| 2,123,457 | Wilson | July 12, 1938 |
| 2,413,972 | Herlocker | Jan. 7, 1947 |
| 2,489,672 | Revukas | Nov. 29, 1949 |
| 2,502,436 | Dawson et al. | Apr. 4, 1950 |